United States Patent [19]
Urrea et al.

[11] Patent Number: 4,559,897
[45] Date of Patent: Dec. 24, 1985

[54] HYDROPHILIC LENS TINTING AND COLORING APPARATUS

[76] Inventors: Peter D. Urrea, 1636 Fuerte Knolls La., El Cajon, Calif. 92020; Geoffrey W. Doris, 4 Silvermere Ave., Paradise, Australia, 5075; Stephen D. Newman, 7 Argyle St., Prospect, Australia, 5082

[21] Appl. No.: 718,183

[22] Filed: Mar. 29, 1985

Related U.S. Application Data

[63] Continuation of Ser. No. 548,605, Nov. 4, 1983, abandoned.

[30] Foreign Application Priority Data

Nov. 11, 1982 [AU] Australia .......................... 91422/82

[51] Int. Cl.⁴ ............................................. B05C 5/02
[52] U.S. Cl. .................................. 118/406; 118/415; 118/412; 118/505
[58] Field of Search ............... 118/504, 505, 406, 415, 118/412; 351/162

[56] References Cited

U.S. PATENT DOCUMENTS 3,168,100 2/1965 Rich ................. 118/500 X
3,885,522 5/1975 MacDonald et al. ............... 118/406

FOREIGN PATENT DOCUMENTS 710230 5/1965 Canada ................................. 351/162
1604403 12/1981 United Kingdom .

Primary Examiner—Norman Morgenstern
Assistant Examiner—Bernard F. Plantz
Attorney, Agent, or Firm—Cushman, Darby & Cushman

[57] ABSTRACT

Apparatus for the coloring or tinting of one or more selected areas of a soft or flexible contact lens to precise measurements comprises a support means formed to closely match one of the surfaces of the lens and a mask means adapted to operatively associate with the support means to delineate said one or more selected areas by providing one or more peripheral zones of compression within the lens to prevent the migration of an applied coloring or tinting medium thereacross. In use the lens is positioned on the support means so that one of the surfaces thereof closely matches the support means, the mask means is arranged to provide one or more peripheral zones of compression delineating said one or more selected areas, and a coloring or tinting medium is applied to at least one selected area.

8 Claims, 21 Drawing Figures

HYDROPHILIC LENS TINTING AND COLORING APPARATUS

This is a continuation of application Ser. No. 548,605, filed Nov. 4, 1983, now abandoned.

This invention relates to an apparatus and method for the colouring or tinting of contact lenses. While it has been found to be particularly useful with those known in the art as the hydrophilic or soft water permeable type of contact lens, it is to be appreciated however that the inventive concept is equally applicable to any other type of soft lenses.

Water permeable lenses comprise a matrix able to absorb significant amounts of water and in doing so become relatively soft and pliable. While this has provided enormous advantage, for example, in terms of wearer comfort over the earlier types of hard plastic lenses, their water permeable nature has given rise to further problems with colouring or tinting. Tinting may be desired or required by the wearer simply to alter or shade the colour of the iris for cosmetic reasons. In other cases it may be a necessary part of the cosmetic rebuilding of a damaged eye and must be done with considerable precision in order to provide at least the external appearance of a normal iris and pupil.

With water permeable contact lenses however, a precise delineation between differently coloured zones representing, for example, the iris and the pupil, or the iris and sclera has up until now been difficult if not impossible. This is because the dye used in the colouring processes once absorbed into the lens material tends before setting to migrate through the matrix and tint areas outside the zone intended to be coloured.

The result is a gradual fading of one colour into an adjacent one which provides a very unnatural appearance especially noticeable with those lenses designed to extend over part of the sclera or white coloured portion of the eye.

While efforts have been made to overcome the above problem by, for example, reducing the thickness of the lens to mitigate the effect of the dye on those areas where clarity is to be preserved or by the use of special paints which coat only the interior or exterior surface of the lens such methods are expensive and also in the case of painting, produce an opaque unnatural appearance.

It is therefore one object of this invention to provide an apparatus and method which ameliorates the above-mentioned disadvantages.

In one broad aspect this invention discloses an apparatus for the colouring or tinting of one or more selected areas of a soft contact lens to precise measurements, the apparatus comprising a support means formed to closely match one of the surfaces of the lens and a mask means adapted to operatively associate with the support means to delineate said one or more selected areas by providing one or more peripheral zones of compression within the lens to prevent the migration of an applied colouring or tinting medium thereacross.

In another aspect this invention also discloses a method of colouring or tinting one or more selected areas of a soft contact lens, the method including the steps of positioning the lens on the support means so that one of the surfaces thereof closely matches the support means, operatively associating the mask means with said support means to provide one or more peripheral zones of compression delineating said one or more selected areas and applying a colouring or tinting medium to at least one selected area.

A preferred embodiment of this invention which has been found to be particularly useful with the water permeable type of soft lens will now be described with reference to the attached drawings in which.

Figure 6E:
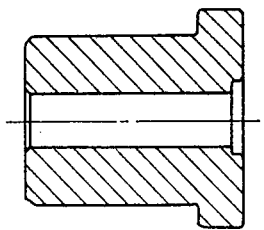
FIG. 6 is an end-view of a lens mask component of the jig assembly adapted for use with a toric contact lens.
FIG. 6A is a cross-section of the lens mask along the lines A—A of FIG. 6.
FIG 6B shows an end-view of a lens mask component of the jig assembly adapted for use with a sphere contact lens.
FIG. 6C is a cross-section of the lens mask of FIG. 6B along the lines C—C.
FIG. 6D shows an end-view of a lens mask component of the jig assembly adapted for occluding the central pupil area of a sphere or toric contact lens.
Figure 6E:
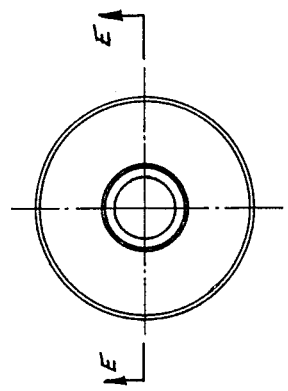
Figure 6D:
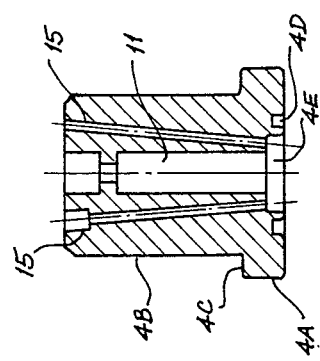
Figure 6D:
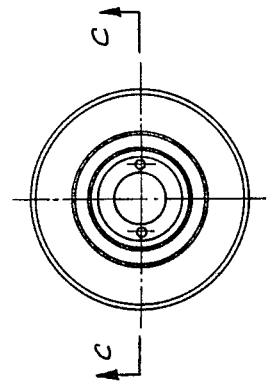

FIG, 6E is a cross-section of the lens mask of FIG. 6D along the lines E—E.

Figure 7A:
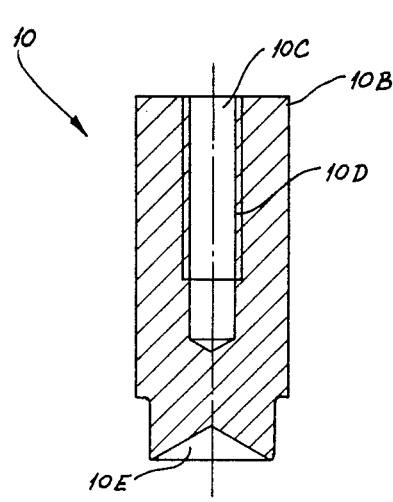
Figure 7C:
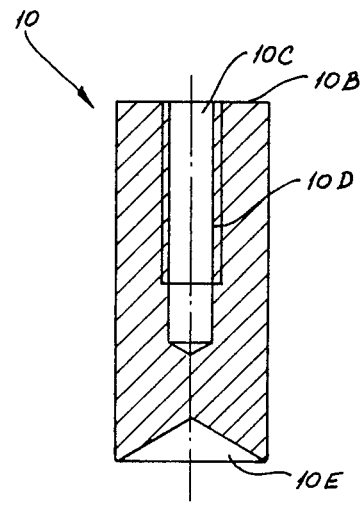
Figure 7:
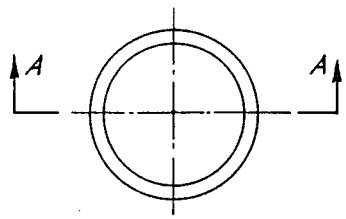

FIG. 7 shows an end-view of one form of pupil mask component for the jig assembly.

FIG. 7A is a cross-section of the pupil mask of FIG. 7 along the lines A—A.

Figure 7B:
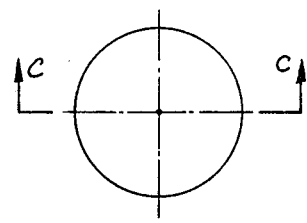

FIG. 7B shows an end-view of a further form of pupil mask component for the jig assembly.

FIG. 7C is a cross-section of the pupil mask of FIG. 7B along the lines C—C.

Figure 8B:
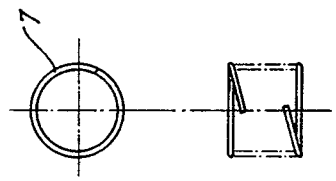
Figure 8A:
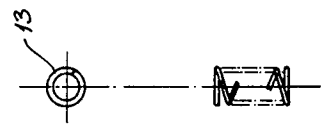
Figure 8:
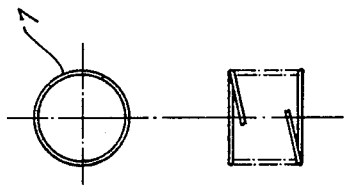

FIG. 8 shows schematic end and side views of one form of tensioning spring for the jig assembly.

FIG. 8A shows schematic end and side views of a mask spring for the jig assembly.

FIG. 8B shows schematic end and side views of a further form of tensioning spring for the jig assembly.

Figure 1:
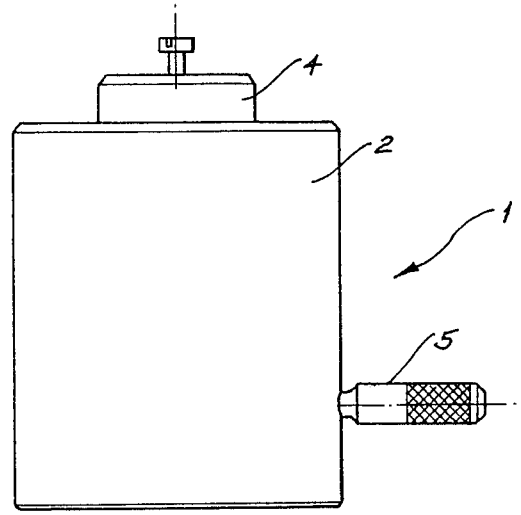
FIG. 1 shows an elevational view of an apparatus according to this invention in the form of a jig assembly.
Figure 2:
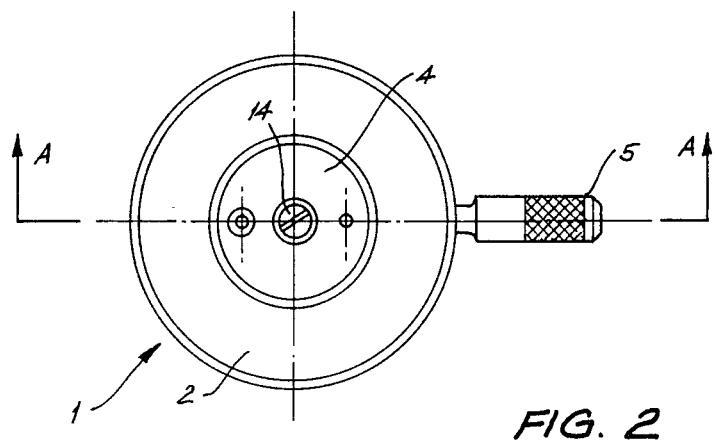
FIG. 2 shows a plan view of the jig assembly of FIG. 1.

Referring first to FIGS. 1 and 2 the jig assembly is indicated generally as 1 and basically comprises a sleeve 2 within which is mounted a base member 3 and lens mask 4.

Both the base 3 and mask 4 are slidably received within the internal bore 2A of the sleeve 2 with the base being secured in the position shown by a removable locking pin 5 extending through a transverse hole 5A in the wall of the sleeve and engaging an annular groove or slot 6 in the base 3. The lens mask 4 is biased downwardly by a tensioning spring 7 extending between a peripheral shoulder 4C of the lens mask and an internal collar 2B of the sleeve so that an "O" Ring 7A mounted on the lower surface of the mask 4 bears down against the upper surface of a water permeable toric contact lens 8 which rests on the upper surface 9 of the base 3. The jig when so assembled provides an annular compression zone adjacent to the periphery of the lens corresponding to the contact area of the "O" Ring 7A. A pupil mask 10 is slideably fitted within a central bore 11 in the lens mask 4, and also biased downwardly by a mask spring 13 so that an annular bottom lip 12 engages the lens and provides a further annular compression zone adjacent the centre of the lens. The tension on the spring 13 and thus the compression force exerted on the lens by the lip 12 of the mask can be increased by varying the distance between the top of the pupil mask 10 and the shoulder of the central bore 11 in the lens mask 4 on which the spring 13 bears against.

There are also entry passages or bores 15 extending through the lens mask 4 to the area 16 of the lens defined between the abovementioned compression zones. A further passage (not shown) may also be provided to the central area 17 of the lens defined by the lip 12 of the pupil mask.

Figure 2A:
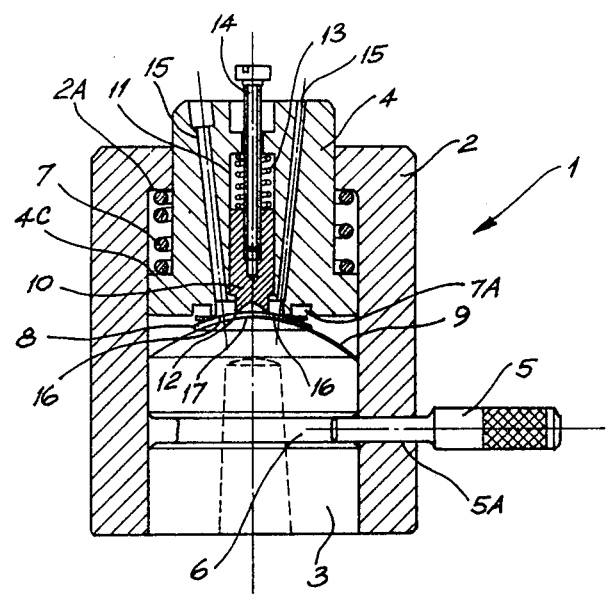
FIG. 2A shows a cross-section of the jig assembly along the lines A—A of FIG. 2.
Figure 3:
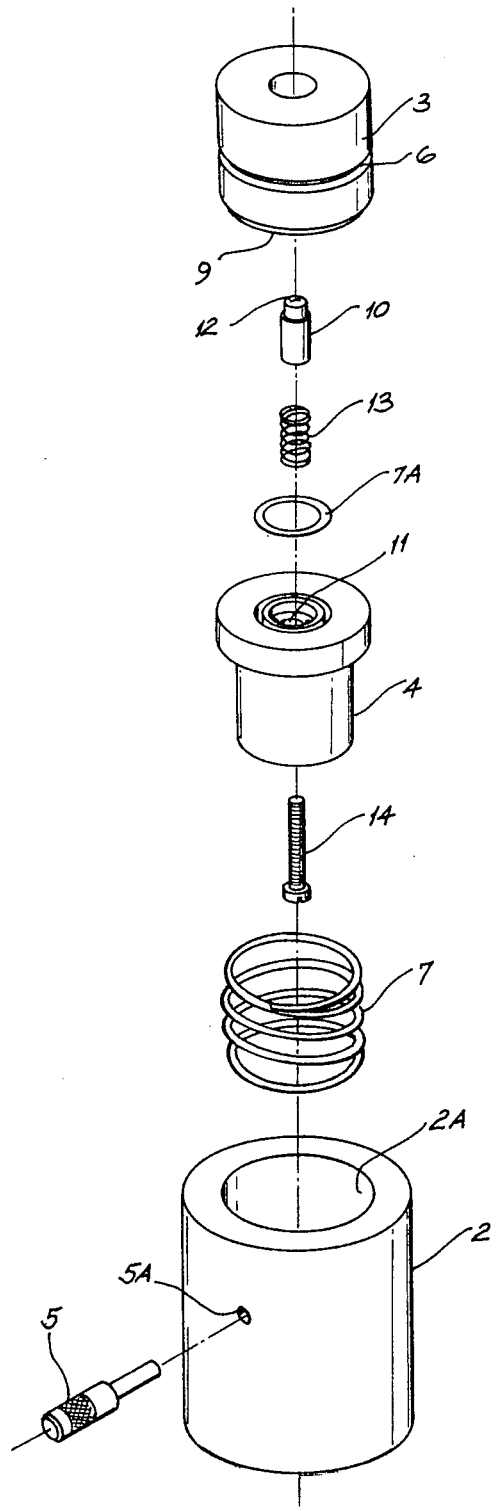
FIG. 3 shows an exploded view of the various components of the jig assembly.
Figure 4:
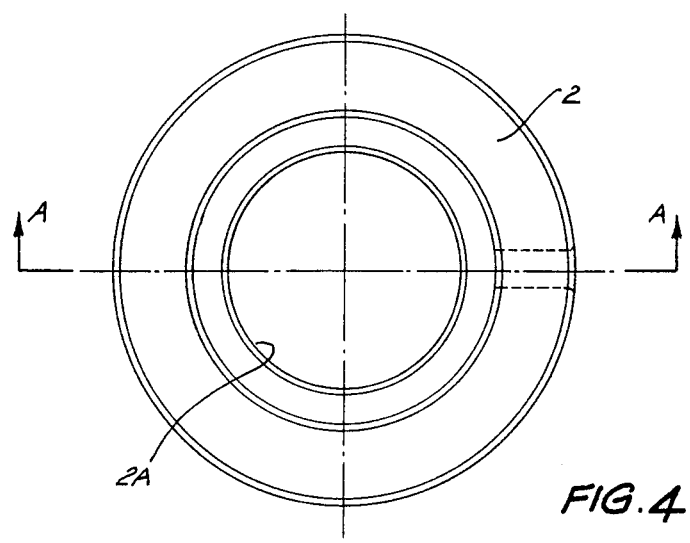
FIG. 4 is a plan view of a sleeve member component of the jig assembly.
Figure 4A:
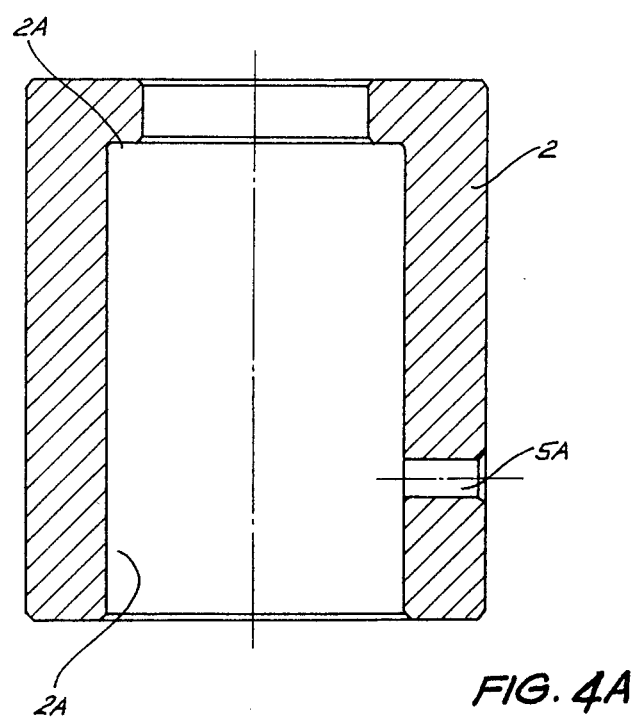
FIG. 4A shows a cross-section of the sleeve member along the lines A—A of FIG. 4.

The operation of the device is as follows. The lens to be coloured or tinted is first centrally positioned on the appropriately curved upper surface 9 of the base member 3, and the jig is then assembled as shown in FIG. 2A so that upper surface of the lens is delineated into the two annular tinting areas 16 and 17 by the aforementioned compression zones. Appropriate colouring or tinting dyes are then introduced to these areas for example via passages 15 to shade or tint the lens by absorption into its water permeable matrix. The compression zones however, prevent any migration and absorption of the colours outside of the defined areas before the dye sets. This enables the production of a lens having an extremly precise, sharp and well defined border between adjacent tinted areas which accurately reproduces to precise measurements the natural colour pattern of the human eye.

Figure 5:
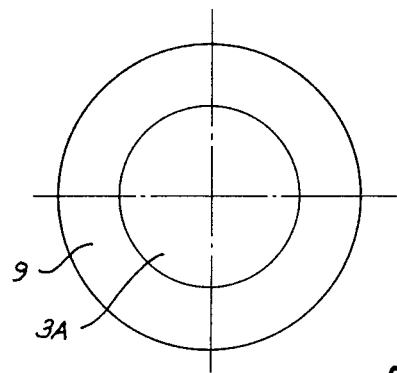
FIG. 5 is a plan view of a base member component of the jig assembly.
Figure 5A:
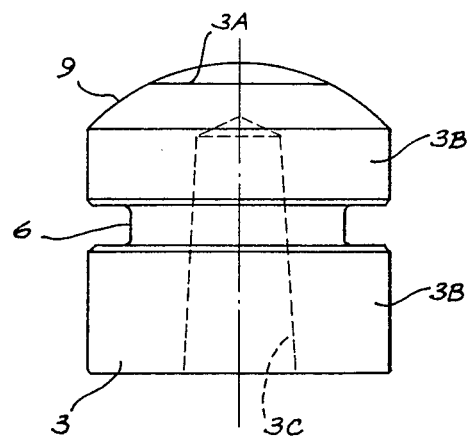
FIG. 5A shows an elevational view of the base member of FIG. 5.

A detailed illustration of the base member is shown in FIGS. 5 and 5A. As mentioned earlier the upper surface 9 of the base member 3 should closely match and engage the surface of the lens it supports in order to avoid any creasing or rupture of the lens. It is therefore preferably formed from a readily machineable material such as brass or nylon which is able to retain a highly polished surface 9. The diameter of the base at least with this particular embodiment is preferably of about 25 mm and a central ring 3A may also be etched into the upper surface 9 to provide a stable seat for the lens and to facilitate its precise centering.

The annular side surfaces 3B of the base member are also machined to provide a close tolerance sliding fit within the internal bore 2A of the sleeve 2. A tapered central recess 3C may also be provided extending upward from the bottom surface of the base member.

Figure 6:
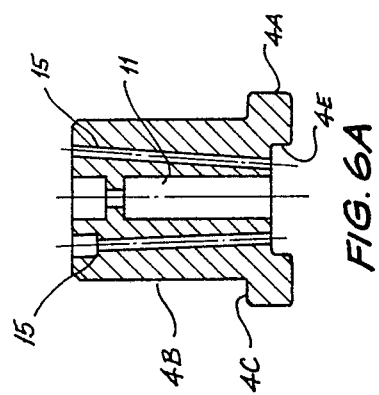
Figure 6:
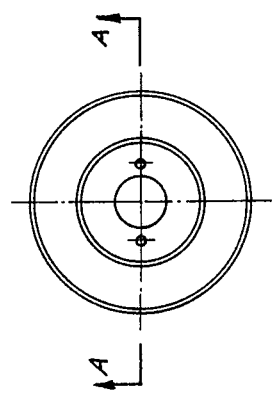

Two types of lens mask 4 depending on whether the areas corresponding the iris and pupil of a toric or sphere lens are to be tinted are shown in FIGS. 6 to 6C. Both masks 4 are formed with an outer cylindrical surface 4A adapted for a close sliding fit inside of sleeve 2 and also include a portion of reduced cross-section 4B to slide within the collar 2B of the sleeve 2 and provide a shoulder 4C to seat for end of the tensioning spring 7 as discussed earlier. The lens masks also include a central bore 11 to receive the pupil mask 10 together with the mask spring 13 and screw 14. The access passages for the injection of colouring or tinting dye preferably comprise 1.5 mm bores 15. The mask for use with the toric lens may also carry an "O" Ring on its lower surface to form an annular compression zone adjacent the periphery of the lens as described earlier and also ensure that lens is held closely adjacent the surface 9 without creasing or folding. In this case an annular groove 4D is provided to receive the ring. The lower surface of each mask includes a central recess 4E leading upward into the bore 11. It is to be appreciated however that the diameter of groove 4D and recess 4E may vary depending on the diameter of the lens and the areas to be tinted.

A further type of lens mask for occluding the central area of a toric or sphere lens corresponding to the pupil area of the wearer is shown in FIGS. 6D and 6E. While its construction and dimensions may be similar to those described earlier provision to mount the "O" ring may be the shoulder in the recess 4E rather than the annular groove 4D which may be deleted together with the bores 15 and the diameter of the recess 4E would precisely correspond to that of the pupil.

A detailed cross-sectional view of two preferred forms of pupil mask 10 for tinting 4 and 5 mm diameter pupil areas is shown in FIGS. 7 to 7C. Each mask comprises an elongated cylindrical member having an outer surface 10A adapted for a close tolerance sliding fit in the central bore 11 of the lens mask. The upper face 10B also has a central hole 10C which is threaded 10D for engagement with the screw 14. With each mask the lower annular lip 12 is preferably formed by the outwardly extending edge of a central conical depression 10E having an included angle of preferably 120°. With the smaller 4 mm mask as illustrated by FIGS. 7 and 7A the lower segment 10E of a mask is also turned down to provide a reduced diameter for the annular lip 12.

Two preferred forms of tensioning springs for use with sphere and toric lens are shown in FIGS. 8 and 8B. With this embodiment they have the following preferred characteristics.

| Sphere | Toric |
| --- | --- |
| .9 mm dia spring wire | 1.2 mm dia spring wire |
| (zinc plate finish) | (zinc plate finish) |
| 2 active coils | 2 active coils |
| 2 closed coils | 2 closed coils |
| 17 mm free length | 17 mm free length |
| Ends closed and ground flush | Ends closed and ground flush |
| 6.3 mm compression = 410 grams | 7.94 mm compression = 1099 grams |
| Rates 65 kg/m | Rate 138 kg/m |

The preferred form of mask spring 13 is shown in FIG. 8A and has the following characteristics 0.3 mm dia spring wire (zinc plated)
4 active coils
2 closed coils
9 mm free length
Ends close and ground flush
3.2 mm compression = 170 gm
Rate 53 kg/m It will thus be appreciated that this invention at least in the form of the embodiment described provides a novel and unique means of tinting or colouring a water permeable contact lens. Clearly however the particular example disclosed is only one form of this invention and a wide variety of modifications to the size and design of the jig assembly and/or is various components may be made according to design preference or to adapt the apparatus for use with different sizes or types of soft lenses including collagen or silicon lenses made from Dimethylpolysiloxan and copolymer combinations of this polymer group.

The claims defining the invention are as follows:

1. An apparatus for the colouring or tinting of one or more selected areas of a soft or flexible contact lens to precise measurements, the apparatus comprising:
    a support means formed to closely match one of the surfaces of the lens;
    a mask means adapted to operatively associate with the support means to delineate said one or more selected areas by providing one or more peripheral zones of compression within the lens to prevent the migration of an applied colouring or tinting medium thereacross;
    biasing means for maintaining said mask means at a predetermined rate of compression against the lens; and
    at least one passage means extending through the mask means communicating to at least one area adjacent a zone of compression for introducing a colouring or tinting dye to the area of the lens adjacent the zone of compression.

2. The apparatus as claimed in claim 1 wherein two concentric zones of compression are provided by two corresponding annualar lips of the mask means defining an area in the lens between the two zones which is in liquid communication with the passage means.

3. The apparatus as claimed in claim 1 wherein said mask means defines a circular area in the center of the lens corresponding to the lens wearer's iris and said passage means extends through the mask means to said circular area.

4. The apparatus as claimed in claim 1 wherein said mask means defines a concentric zone about the axis of the lens corresponding to the lens wearer's pupil and said passage means extends through the mask means to said concentric zone.

5. The apparatus as claimed in claim 1 wherein said mask means defines (1) a circular area in the center of the lens corresponding to the lens wearer's iris and a first passage means extending through the mask means to said circular area, and (2) a concentric zone about the axis of the lens corresponding to the lens wearer's pupil and a second passage means extending through the mask means to said concentric zone.

6. The apparatus as claimed in claim 2 wherein the annular lips of the mask means engage the convex surface of the lens.

7. The apparatus as claimed in claim 1 wherein the support means include an upper convex surface formed to closely match the concave surface of the lens.

8. The apparatus as claimed in claim 2, wherein the mask means is slidably received within, and axially aligned by the bore of a sleeve member so that the annular lips of the mask means are biased against the facing upper surface of the support means removably secured within the bore.

* * * * *